United States Patent [19]
Rameson

[11] 3,845,566
[45] Nov. 5, 1974

[54] DIFFERENTIAL GAGING INSTRUMENT

[75] Inventor: William W. Rameson, Santa Monica, Calif.

[73] Assignee: TRW Inc., Redondo Beach, Calif.

[22] Filed: Mar. 30, 1972

[21] Appl. No.: 239,558

[52] U.S. Cl. .......................... 33/174 L, 33/DIG. 17
[51] Int. Cl. ............................................. B23f 23/08
[58] Field of Search ...... 33/DIG. 17, DIG. 5, 174 R, 33/174 L, 174 E, 181 R, 181 AT, 143 L, 147 N, 203, 203.15; 324/34 D, 34 PS, 34 L, 34 TK

[56] References Cited
UNITED STATES PATENTS

| | | | |
|---|---|---|---|
| 2,208,910 | 7/1940 | Pampel | 33/147 N |
| 2,412,380 | 12/1946 | Aller | 33/147 N |
| 2,419,280 | 4/1947 | Neff | 33/147 N |
| 2,419,461 | 4/1947 | Neff | 33/DIG. 17 |
| 2,583,791 | 1/1952 | Neff | 33/DIG. 5 |
| 2,675,621 | 4/1954 | Mims | 33/DIG. 17 |
| 3,100,889 | 8/1963 | Cannon | 33/143 L |
| 3,233,328 | 2/1966 | Schooley | 33/143 L |
| 3,520,063 | 7/1970 | Rethwish et al. | 33/174 L |
| 3,666,906 | 5/1972 | Zimmerman | 33/174 L |

*Primary Examiner*—John W. Huckert
*Assistant Examiner*—Edward J. McCarthy
*Attorney, Agent, or Firm*—Daniel T. Anderson; Donald R. Nyhagen; Jenny A. Dinardo

[57] ABSTRACT

A gaging instrument for measuring the difference between selected dimensions of two work parts. The instrument has two pair of gaging jaws each including a fixed jaw and a movable jaw for gaging the selected dimension of one work part, and readout means connected to the movable jaws for providing a readout representing the difference between the selected part dimensions. The disclosed instrument is a clearance gage which measures two inter engagable parts, such as an annular cam and rotor, and provides an electrical output representing the clearance between the parts when assembled in interfitting relation.

4 Claims, 4 Drawing Figures

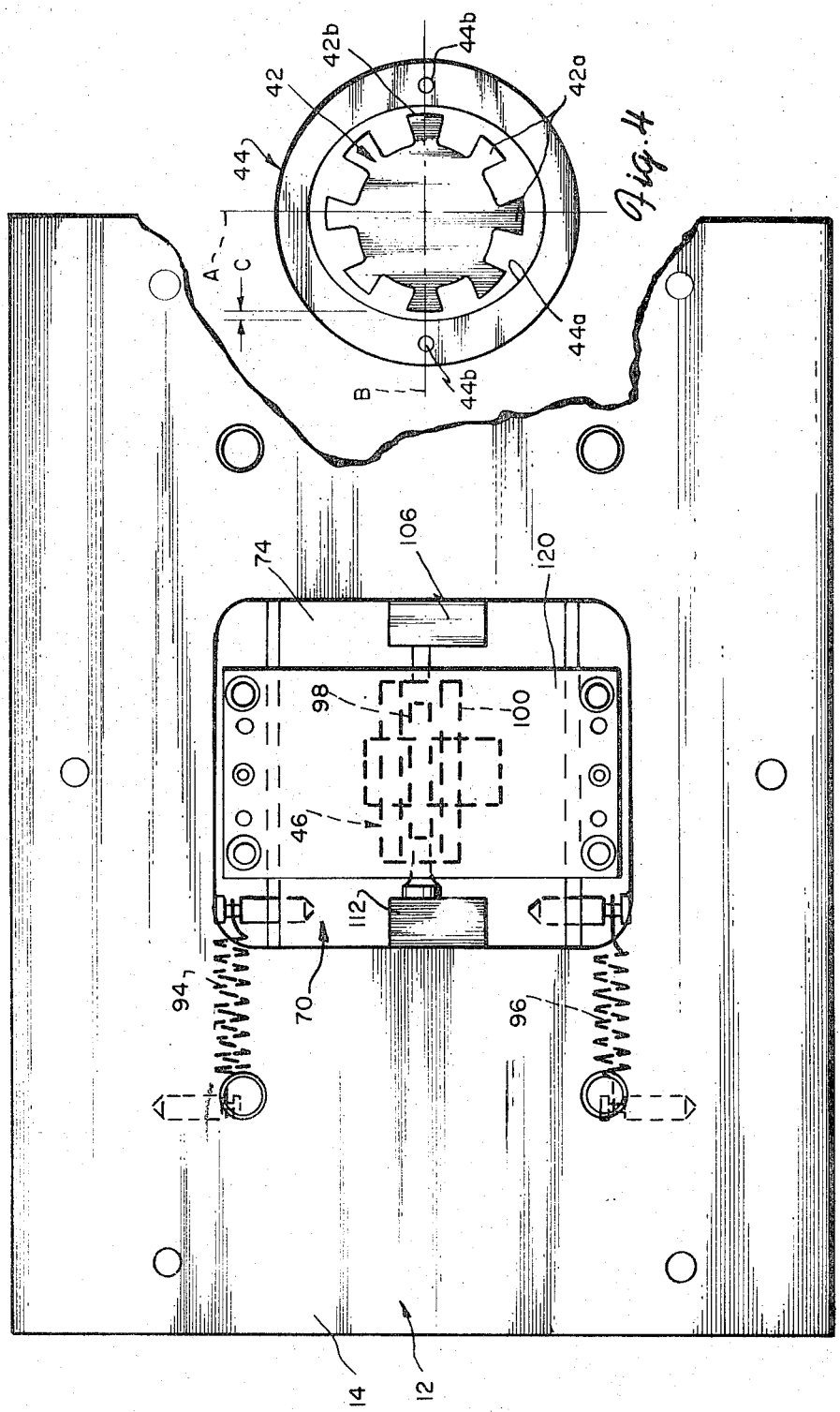

DIFFERENTIAL GAGING INSTRUMENT

BACKGROUND OF THE INVENTION

1. Field of the Invention

This invention relates generally to the gaging art and more particularly to a novel gaging instrument for measuring the difference between selected dimensions of two work parts.

2. Prior Art

As will become evident from the later description, the gaging instrument of the invention may be designed to gage parts of various kinds and shapes for the purpose of determining the difference between selected dimensions of the parts. The primary application of the instrument involves gaging the cam and rotor of an automotive steering pump for the purpose of determining the clearance between these parts when assembled. For this reason, the instrument will be described in connection with this particular application.

Automotive steering pumps have an outer annular cam with an opening containing a toothed rotor. The cam opening is elongated so as to have a generally elliptical shape with a major axis in the plane of the long dimension and a minor axis in the plane of the narrow dimension of the opening. The rotor axis coincides with the intersection of these major and minor axis planes. Proper operation of such steering pumps requires a precise clearance between the rotor and inner cam surface measured in the plane of the minor axis of the cam opening.

In order to determine this rotor-cam clearance, it is necessary to measure the width of the cam opening in the minor axis plane of the opening and the diameter of the rotor between the outer surfaces of a pair of diametrically opposed rotor teeth and then subtract the rotor diameter from the width of the cam opening. The actual clearance between the rotor and cam is one half the difference between the cam opening width and rotor diameter. Heretofore, such cam-rotor clearance has been obtained by gaging each cam and rotor separately and converting the resulting dimensions to a clearance dimension. This method of gaging, while yielding accurate clearance measurements, is time consuming and ill-suited to the high rate mass production methods by which automotive steering pumps are made.

SUMMARY OF THE INVENTION

The present invention provides a novel gaging instrument for measuring the difference between selected dimensions of two work parts, such as the cam and rotor of an automotive steering pump. The instrument has a base mounting two pairs of gaging jaws for gaging the selected dimensions of the two work parts, respectively. Each jaw pair has a fixed jaw rigid on the mounting base and a movable jaw supported on the base for movement toward and away from the fixed jaw. The jaws of each pair are arranged to engage their respective work part in such a way that the spacing between the part engaging surfaces of the jaws equals the selected part dimension to be gaged. Operatively connected to the two movable jaws are readout means for providing a readout representing the difference between the jaw spacings of the two jaw pairs and thereby the difference between the selected dimensions of the parts being gaged.

In the particular gaging instrument hereafter described, one pair of gaging jaws are designed to project through the opening of an automotive steering pump cam in the plane of the minor axis of the opening and to gage the width of the opening in this plane. The other pair of jaws are designed to straddle the pump rotor and gage the outer rotor diameter. The readout means of this instrument is a transducer which provides an electrical output representing the difference between the cam opening width and rotor diameter and thereby the clearance between the cam and rotor when assembled. The transducer output or readout may be displayed by a suitable meter, recorder, or the like.

According to the preferred method of operating this steering pump gaging instrument, a master pump cam and pump rotor which are accurately machined to the proper or design clearance are first placed in the instrument and the latter is adjusted to provide a null output or readout. When a production cam and rotor are gaged, therefore, the instrument output or readout represents the difference, if any, between the design clearance of the master cam and rotor and the actual clearance of the production cam and rotor. The readout meter or recorder may be calibrated and arranged to indicate simply whether or not each gaged production cam and rotor are within acceptable tolerances.

BRIEF DESCRIPTION OF THE DRAWINGS

FIG. 3 is a bottom view of the instrument; and

FIG. 4 illustrates two parts to be gaged which, in this instance, are the cam and rotor of an automotive steering pump.

DESCRIPTION OF THE PREFERRED EMBODIMENTS

Figure 1:
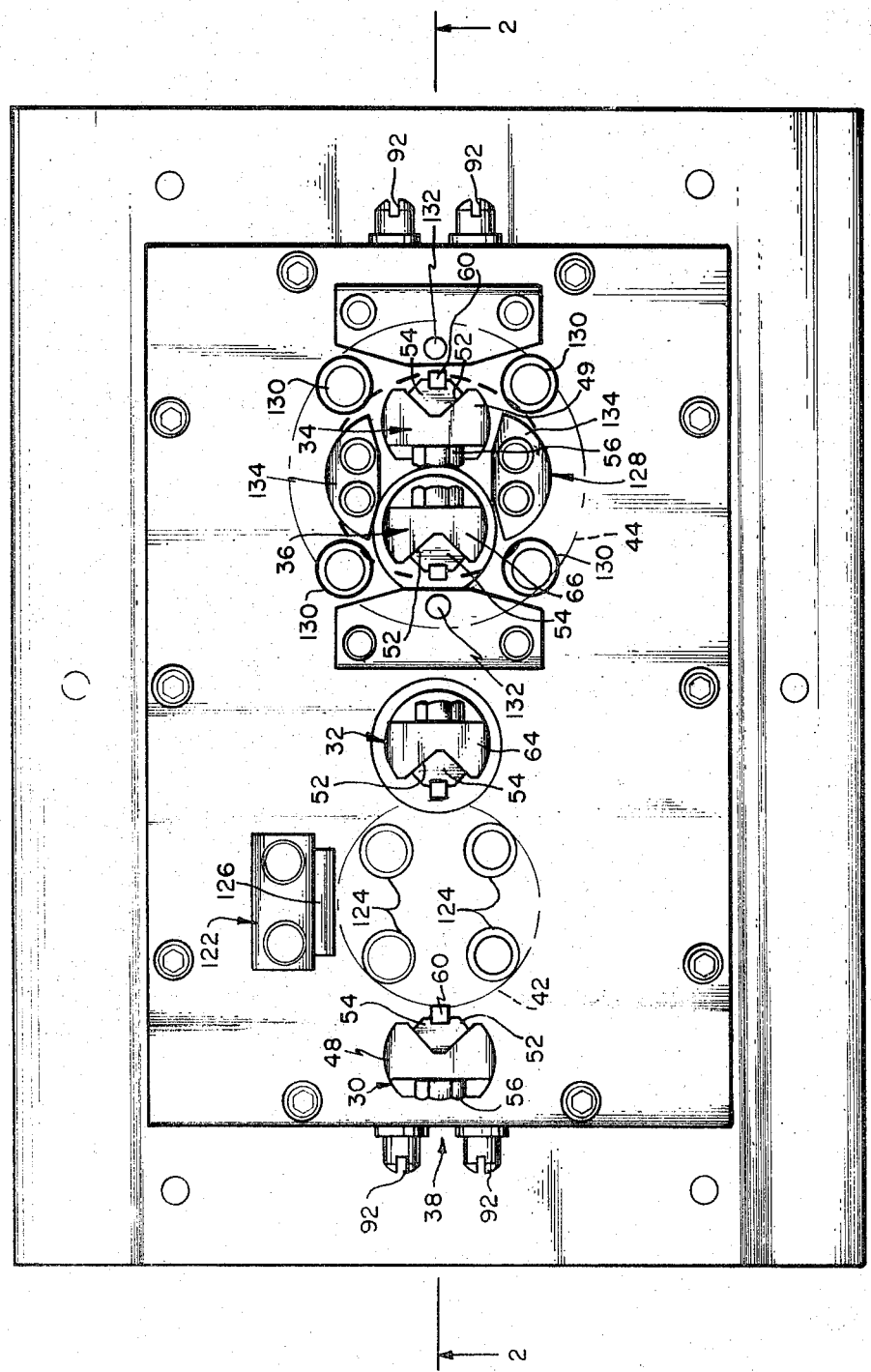
FIG. 1 is a top view of a gaging instrument according to the invention.
Figure 2:
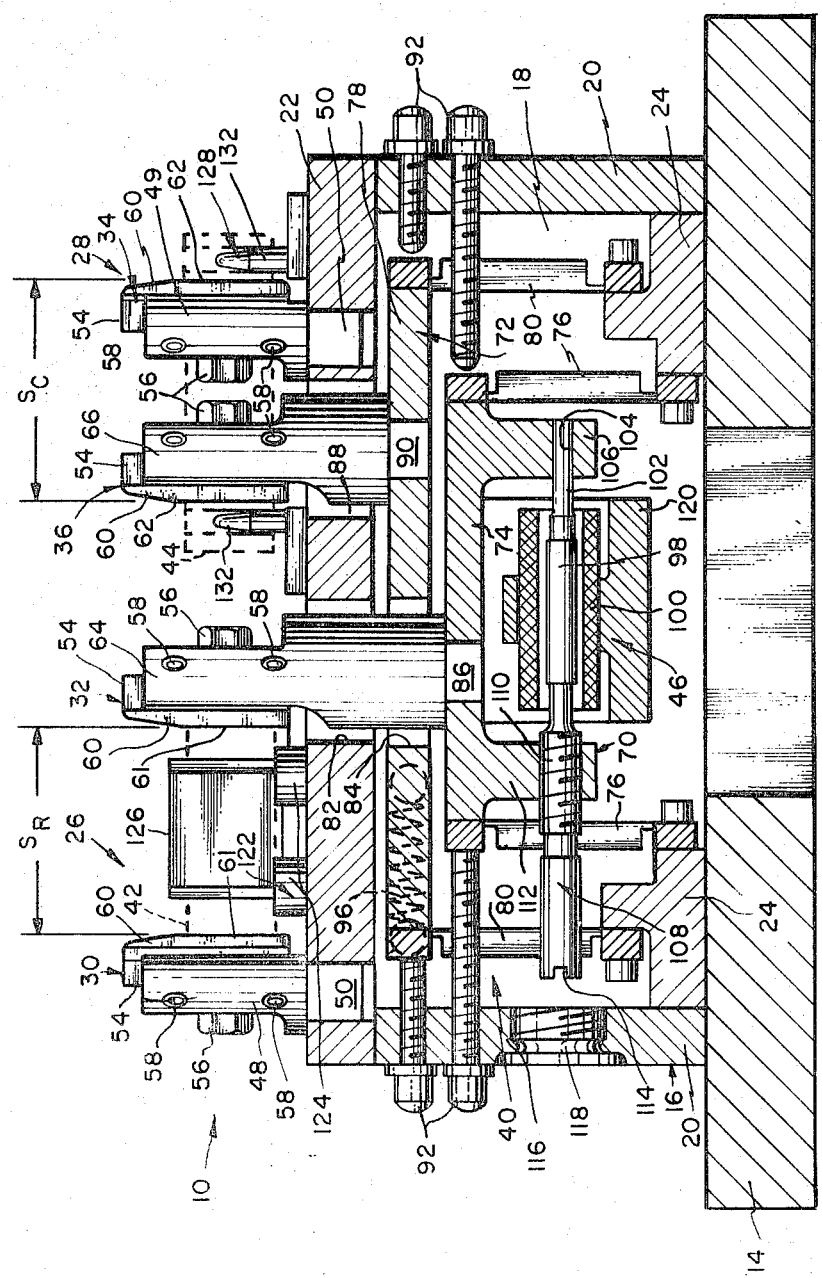
FIG. 2 is a section taken on line 2—2 in FIG. 1.

The illustrated gaging instrument 10 has a mounting base 12 with a lower base plate 14. Fixed to and rising above the base plate is enclosure 16 having side walls 18, end walls 20, and a top wall 22. Mounting brackets 24 are fixed to the base plate 14 at the inner sides of the enclosure end walls 20.

At the top of the base enclosure 16 are two pairs 26, 28 of gaging jaws. Jaw pair 26 has a fixed jaw 30 and a movable jaw 32. Jaw pair 28 has a fixed jaw 34 and a movable jaw 36. These several jaws are arranged in a row 38 extending lengthwise of the mounting base 12. The two fixed jaws 30, 34 are located adjacent the ends of the top wall 22 of the base enclosure 16 and are rigidly attached to the top wall in the manner described below. The two movable jaws 32, 36 are located between the fixed jaws and are supported by means 40 for independent movement toward and away from their respective fixed jaws along a common direction line parallel to the jaw row 38.

Gaging instrument 10 is operable to gage selected dimensions of two work parts 42, and 44. As will be explained in more detail presently, these work parts are placed in gaging relation to the gaging jaw pairs 26, 28, respectively, such that the spacing between the part engaging surfaces of the jaws of the jaw pairs equals the selected dimensions of the corresponding parts. Operatively connected to the movable gaging jaws 32, 36 are readout means 46 for providing a readout representing the difference in the jaw spacing and hence the difference in the selected part dimensions being gaged.

The particular gaging instrument illustrated is designed to gage the cam and rotor of an automotive steering pump to obtain a measurement representing the clearance between these parts when assembled. In the drawings, part 42 is the rotor and part 44 is the cam.

Referring in greater detail to this illustrated gaging instrument, the fixed gaging jaws 30, 34 have similar upstanding mounting posts 48, 49 with base pins 50 which are press fitted in the top wall 22 of the mounting base enclosure 16. Each post has a longitudinal, laterally opening V-groove 52 in one side receiving a mating wedge 54. Wedges 54 are secured to their respective posts by bolts 56 and have their tapered side faces seating against set screws 58 threaded in the posts. Fixed in the outer longitudinal sides of the wedges are hardened inserts 60 having gaging surfaces 61, 62 for contacting the work parts 42, 44, respectively.

The movable gaging jaws 32, 36 have upstanding mounting posts 64, 66, respectively, similar to but somewhat larger than the fixed jaw mounting posts 48, 49. Posts 64, 66 extend below the top plate 22 of the mounting base enclosure 16 for attachment to the movable jaw supporting means 40, as described below. Movable jaws 32, 36, like the fixed jaws 30, 34 have wedges 54 positioned within V-grooves 52 in their supporting posts 64, 66 in seating contact with set screws 58 threaded in the posts and are secured to the posts by bolts 56. Fixed in the outer longitudinal sides of the movable jaw wedges are hardened inserts 60 having gaging surfaces 61, 62 for contacting the parts 42, 44, respectively.

The wedges and inserts 54, 60 of the gaging jaw pair 26 are located at the inner confronting sides of the corresponding jaw posts 48, 64 so that the gaging surfaces 61 of this jaw pair face one another. The wedges and inserts of jaw pair 28, on the other hand, are located at the outer, oppositely facing sides of the jaw posts 49, 66 so that the gaging surfaces 62 of the latter jaw pair face away from one another. Gaging surfaces 61 are flat while gaging surfaces 62 are rounded. As shown best in FIG. 1, gaging jaw inserts 60 are located in a common plane parallel to the direction line of movement of the movable jaws 32, 36. The gaging surfaces 61, 62 of the jaws are generally normal to the direction line. In this latter regard, it is significant to note that the gaging jaw screws 56, 58 are adjustable to angularly adjust the gaging surfaces relative to the direction line of movement of the movable jaws.

The means 40 which support the movable gaging jaws 32, 36 for independent movement toward and away from their respective fixed gaging jaws 30, 34 comprise a pair of independently movable carriages 70, 72. The lower carriage 70 has a top plate 74 below and parallel to the top wall 22 of the base enclosure 16 and attached at its ends to the base mounting brackets 24 by means of flexures 76. Upper carriage 72 has a top plate 78 between and parallel to the top base wall 22 and lower carriage plate 74 and attached at its ends to the base brackets 24 by flexures 80. The lower end of the mounting post 64 of movable jaw 32 extends through enlarged openings 82, 84 in the top base wall 22 and the upper carriage plate 78 and has a base pin 86 press fitted into the lower carriage plate 74. The lower end of the mounting post 66 of movable jaw 36 extends through an enlarged opening 88 in the top base wall and has a base pin 90 press fitted into the upper carriage plate 78.

Flexures 76, 80 support the carriage plates 74, 78 for movement parallel to the direction line of movement of the movable gaging jaws 32, 36 and thereby support these jaws for movement along the direction line toward and away from their respective fixed jaws 30, 34. The gaging post openings 82, 84, 88 are sized to accommodate the required maximum gaging movement of the movable jaws. Threaded in the base enclosure end walls 20 are adjustable stop screws 92 for limiting such gaging movement of the movable jaws. Springs 94, 96 are connected between the enclosure side walls 18 and the movable jaw carriages 70, 72 for biassing the movable gaging jaw 32 toward its fixed gaging jaw 30 and the movable gaging jaw 36 away from its fixed gaging jaw 34.

The illustrated instrument readout means 46 is a linear variable differential transducer having a core 98 and a coil 100 with their axis parallel to the direction line of movement of the movable gaging jaws 32, 36. Core 98 has smooth coaxial pin 102 at one end which fits slidably within a bore 104 extending through a lug 106 depending from the underside of the lower carriage plate 74. Coaxially fixed to the opposite end of the core is a shaft 108 having a central portion 110 threaded in a second depending lug 112 on the lower carraige plate. The outer end of the shaft 108 has a slot 114 for receiving a screw driver inserted through an opening 116 in the base enclosure 16 to permit rotation of the shaft and thereby axial adjustment of the transducer core 98 relative to the lower gaging jaw carriage 70. Opening 116 is normally sealed by a removable threaded plug 118. Transducer coil 100 is fixed to a depending cradle 120 attached to the sides of the upper gaging jaw carriage plate 78 and extending below and under the lower carriage plate 74. The leads (not shown) of the coil extend to the outside of the base enclosure 16 for connection to a suitable readout instrument, such as a meter or recorder, as will be explained presently.

As noted earlier, the illustrated parts 42 and 44 to be gaged are a rotor and cam, respectively, for an automotive steering pump. Referring to FIG. 4, rotor 42 has circumferentially spaced teeth 42*a* with tip surfaces 42*b* which are cylindrically curved about the rotor axis. Cam 44 has an annular shape and an elongated or generally elliptical opening 44*a* with a major axis A and a minor axis B. Extending through the cam at opposite sides of the opening 44*a* and on the minor axis B are a pair of locating holes 44*b*. When assembled, the rotor 42 is positioned in the cam opening 44*a* with the rotor axis passing through the intersection of the major and minor cam axes A and B. The present gaging instrument is designed to gage or measure the clearance C between the rotor and cam along the minor axis B.

In gaging operation of the instrument 10, rotor 42 is placed between the gaging jaws 30, 32 which are external gaging jaws for gaging the external rotor diameter. The instrument is provided with locating means 122 for locating the rotor in proper gaging position between the jaws 30, 32, wherein the jaw surfaces 61 engage the tip surfaces 42*b* of diametrically opposed rotor teeth 42*a* on a diameter of the rotor. These locating means comprise four hardened pins 124 with upper faces on which the rotor rests and a stop 126 against which the rotor abuts. From this description, it will be understood that the spacing $S_R$ between the surfaces 61 of the external gaging jaws 30, 32, when in gaging contact with the rotor 42, equals the rotor diameter.

Cam 44 is placed over the gaging jaws 34, 36 which are internal gaging jaws for gaging the internal diameter of the rotor opening 44a along its minor axis B. Locating means 128 are provided for locating the cam in proper gaging position relative to the jaws wherein the jaw surfaces 62 contact the inner cam wall along the minor axis. These locating means comprise four hardened pins 130 having upper faces on which the cam rests, locating pins 132 which fit within the cam locating holes 44b, and arcuate locating blocks 134 which engage the inner wall of the cam along its major axis A. These locating pins and blocks have sufficient clearance with the cam to permit the latter to float slightly in the direction of its minor axis B to engage the gaging surface 62 of the fixed gaging jaw 32. From this description, it is evident that the spacing $S_C$ between the surfaces 62 of the internal gaging jaws 34, 36, when in gaging contact with the cam 44, equals the diameter of the cam opening 44a along its minor axis B.

It will be understood from the earlier description that the gaging jaw carriages 70, 72 support the movable gaging jaws 32, 36 for independent movement into gaging contact with their respective work parts 42, 44 in the manner just explained. The carriage springs 94, 96 bias the movable jaws into such gaging contact with the parts so that it is merely necessary to press the parts downwardly into gaging position with their respective gaging jaws 30, 32 and 34, 36. To facilitate this insertion of the parts to gaging position, the upper ends of the gaging jaw surfaces 61, 62 are beveled, as shown.

Since the gage transducer 46 produces an output representing the relative position of the transducer core 98 and coil 100 and this relative position of the core and coil is related to the relative positions of the movable gaging jaws 32, 36, it is evident that the instrument may be calibrated, by properly adjusting the transducer core relative to the coil by rotation of the core shaft 108 in the manner explained earlier, to produce an output proportional to the actual clearance C between the rotor 42 and cam 44. This output or clearance can be displayed or recorded by a suitable indicating or recording instrument.

According to the preferred method of gaging, however, the gaging instrument 10 is calibrated to produce an output representing the difference, if any, between the clearance of the rotor and cam being gaged and a pre-established correct or design clearance. This is accomplished by first placing in gaging position in the gaging instrument a master rotor and cam which have been accurately machined to have the correct design clearance and adjusting the transducer 46 to produce a null output. Thereafter, when a production rotor and cam are gaged, the transducer output represents the difference, if any, between the design clearance and the actual clearance of the production parts. The transducer may be connected to an instrument for indicating simply whether or not the clearance of the production rotor and cam is within acceptable tolerance limits of the design clearance.

When the rotor 42 and cam 44 are assembled, the rotor is confined between side plates fixed to the side faces of the cam. The rotor is thus constrained with its side faces parallel to and substantially coplanar with the cam side faces. On the other hand, the tip surface 42b of the rotor teeth 42a and the wall surface of the rotor opening 44a may be inclined at slight angles to the side faces, that is the axes of curvature of these surfaces may be inclined slightly to the side faces. As a consequence, the clearance dimension C which must be measured is not the difference between the actual rotor diameter and minor cam opening diameter measured normal to their axes of curvature but rather the difference between the profile or projected rotor diameter and cam opening diameter. It is evident that the present gaging instrument measures this difference in profile diameters of the rotor and cam.

What is claimed as new in support of letters Patent is:

1. A gaging instrument for comparing selected dimensions of two work parts, comprising:
    a mounting base having a top plate;
    first and second carriages mounted on said base below said top plate for independent movement relative to one another and to said base along direction lines parallel to one another and to said plate;
    each carriage including a jaw mounting plate, said carriage plates being located one over the other below said top plate with the second carriage plate located between said top plate and first carriage plate;
    a first pair of gaging jaws including a stationary jaw fixed to and rising from said top plate and a movable jaw fixed to said first carriage plate and rising from said first carriage through openings in said second carriage plate and top plate for movement of said movable jaw toward and away from said stationary jaw by movement of said first carriage along its direction line of movement;
    a second pair of gaging jaws including a stationary jaw fixed to and rising from said top plate and a movable jaw fixed to said second carriage plate and rising from said second carriage through an opening is said top plate for movement of said latter movable jaw toward and away from said latter stationary jaws by movement of said second carriage along its direction line of movement;
    the upper ends of said jaws projecting above said plate and having work engaging surfaces;
    means on said top plate for supporting said parts in gaging relation to said jaw pairs, respectively; and transducer means including relatively movable members on said carriages, respectively, for generating an electrical signal representing the relative positions of said members parallel to said direction lines.

2. A gaging instrument according to claim 1 wherein:

said transducer means comprises a linear variable differential transducer including a coil mounted on one carriage and a core mounted on the other carriage.

3. A gaging instrument according to claim 1 wherein:

said base has an essentially closed space below said base top plate containing said carriages and transducer means.

4. A gaging instrument according to claim 1 wherein:

said work engaging surfaces of said first jaw pair are located on the confronting inner sides thereof, whereby said first jaw pair is adapted to gage the outer diameter of a part; and said work engaging surfaces of said second jaw pair are located on the outer sides thereof, whereby said second jaw pair is adapted to gage the inner diameter of a part.

* * * * *